(No Model.)
F. W. STANLEY.
TYPE WRITING MACHINE.
No. 506,345.  Patented Oct. 10, 1893.
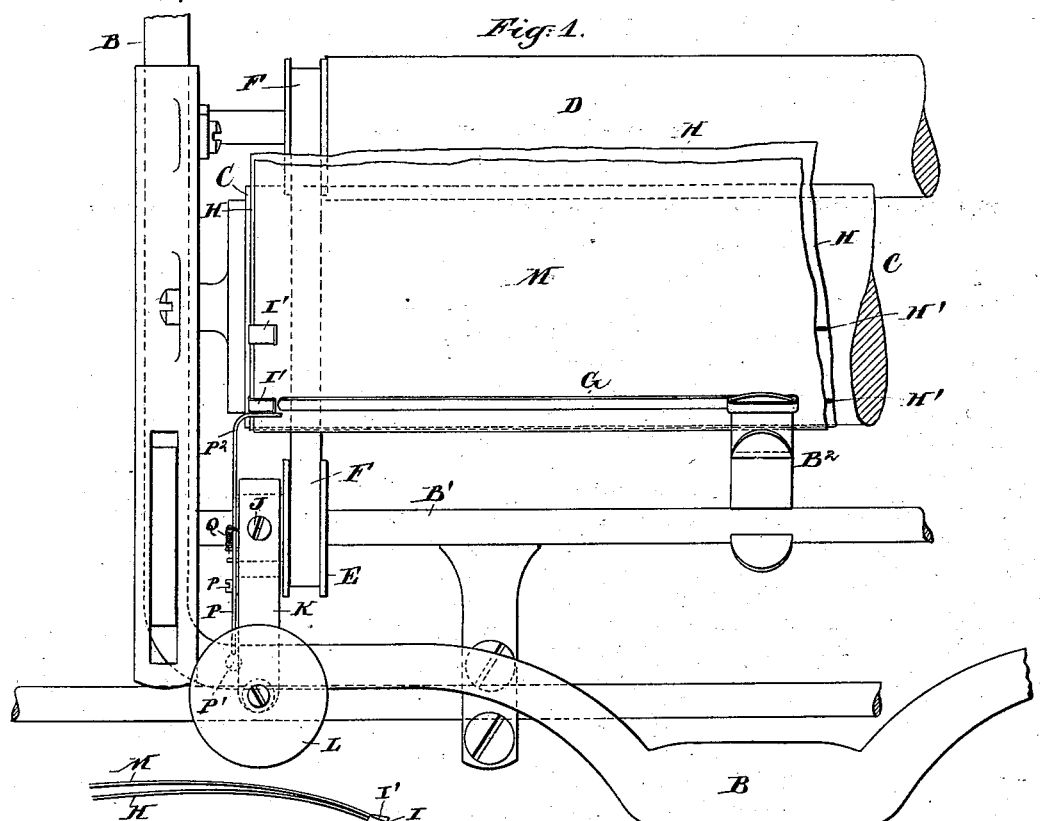
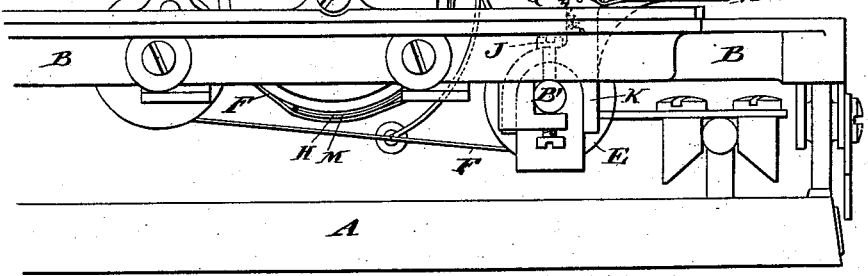
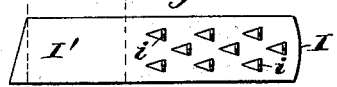
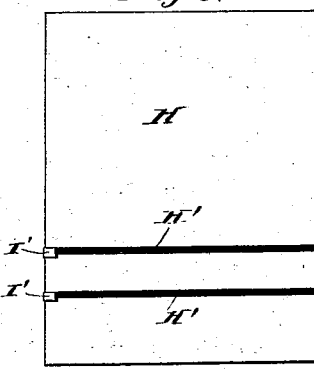
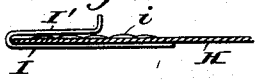
Witnesses:
Charles H. Searle,
M. T. Boyle.
Inventor:
Frank W. Stanley
by his attorney

UNITED STATES PATENT OFFICE.

FRANK W. STANLEY, OF BROOKLYN, NEW YORK, ASSIGNOR TO HIMSELF AND SAMUEL H. TACY, OF SAME PLACE.

TYPE-WRITING MACHINE.

SPECIFICATION forming part of Letters Patent No. 506,345, dated October 10, 1893.

Application filed June 2, 1893. Serial No. 476,336. (No model.)

*To all whom it may concern:*

Be it known that I, FRANK W. STANLEY, of Brooklyn, Kings county, in the State of New York, have invented a certain new and Improved Tympan and Indicator for Type-Writing Machines, of which the following is a specification.

It is common to employ means for indicating when the end of each line is approaching. My improvement indicates in a somewhat analogous manner when the writing has approached the bottom of the sheet. In what I esteem the most complete form of the invention I employ two indicators, the first arranged to give warning when only about the proper space remains for the closing lines of a letter, and the second to indicate when there is not sufficient space for another line of writing. I make each indicator extend a little inward upon the tympan, with sufficient space under it to receive the edge of the paper. These indicators move upward with the paper. I provide a removable arm carried on what is generally termed the envelope-holder, a brace which stands in front of the type-written matter and holds the paper close to the cylinder. This arm aids the eye in determining when, by the feeding upward of the paper, each indicator has reached that level. The device can serve by thus indicating to the eye alone, but I prefer to provide also means whereby a signal will be given to the ear, when each indicator reaches the proper line.

The accompanying drawings form a part of this specification and represent what I consider the best means of carrying out the invention.

Figure 1 is a plan view of a portion of a type writing machine with my improvements attached, and Fig. 2 a corresponding side elevation of the same, certain portions being broken away. Fig. 3, on a smaller scale, is a plan view of the tympan and its attached indicators alone. Fig. 4 is a plan view of one of the indicators partially manufactured. It is in the extended condition which obtains prior to the folding. Fig. 5 is a corresponding edge view. Fig. 6 is a cross-section of a portion of a tympan with an edge view of an indicator in its properly folded condition ready to serve. Fig. 7 is an edge view of a portion of the tympan with an end view of the indicator.

Similar letters of reference indicate corresponding parts in all the figures where they appear.

A indicates portions of the fixed frame-work of the machine. B is the traveling carriage, certain portions being represented when necessary by super-numerals as B'. C is the cylinder, which serves as a platen. It is supported in fixed bearings carried on the carriage B. D is the feed-roller, E one of the ordinary grooved pulleys, turning on the bar B', and F one of the light rubber bands which run between the roller D and the cylinder C, moving forward in contact with the latter and ultimately around one of the pulleys E, and aiding to hold the paper gently and steadily in contact with the under side of the cylinder. All these parts, and such others as are not otherwise described, may be of the construction and arrangement ordinarily adopted in what is known as the Remington type-writer.

$B^2$ is the ordinary envelope-holder or paper guide.

G is a removable index fitted thereon when my invention is to be used. It extends horizontally to the left, and aids the eye in determining when the indicator has, by the feeding of the paper upward for the several lines, come to the required level.

I provide a sheet of good paper, which I call the tympan, cut to the size of the sheet which is to be type-written on. I propose to provide several of these tympans of different sizes, adapted to serve respectively for large letter paper, note paper, and other sizes which are likely to be required. For most offices, one sheet should be of a proper size for the legal-cap paper used. A description of one tympan, which I will assume is adapted for note-paper, will suffice for all.

H is the tympan sheet.

I I are indicators, of thin sheet brass, each formed with a number of points $i$. By pressing these points through the paper and clinching them, the indicators are firmly and permanently attached to the tympan. Each indicator is folded as shown; one portion, that which is fastened to the tympan, lies on the under or back face of the tympan, and the other part I' on the front of the tympan, with a sufficient space between it and the tympan to receive the edge of the paper M on which the type-writing is to be produced. A strong black line H' is printed or otherwise produced across the face of the tympan H opposite the upper edge of each indicator I.

K is a frame which is adapted to be secured on the carriage B by means of the screw J, and carries a small bell L.

P is a lever carrying a sufficient hammer head P' pivoted to the frame K at $p$, and having an arm $P^2$ which extends into the path of the indicators, I. This lever is subject to the force of a gentle spring Q. It is adjusted with its head P' in the interior of the bell L, just out of contact therewith.

In the use of the invention, the tympan H is removed from the machine and the sheet of paper M is set in place with one edge under the folds I' of the indicators. The paper thus accompanied by the tympan is inserted in the machine in the ordinary manner, and the machine being operated in the usual manner, the type-writing proceeds in all respects as usual. When, by the successive feeding movements of the paper and tympan forward and upward, the sheet M has been nearly filled with the printed impressions, and the first or uppermost of the two indicators comes into line with the arm G, the operator knows that there is only about sufficient space below for the ordinary formal termination of the letter. As the eye may not be sufficiently observant to recognize the conditions, the ear receives warning through the striking of the hammer P' against the inner surface of the bell L. The blow of the hammer is due to the action of the folded part I' of the indicator against the arm $P^2$ of the lever P. This action first turns the lever P against the force of the gentle spring Q and then liberates it. On the liberation of the lever the spring Q brings it smartly back to a little beyond its original position, causing its head to strike the bell. These parts are so adjusted that the hammer P' will be lifted a little earlier, and will be liberated so as to make the blow at the same time that the indicator arrives in line with the cross bar G. In case the warning thus given is disregarded and the type-writing is continued two or three lines farther, the second indicator comes into line with the arm G, and the same operation is repeated, the warning being given both through the eye and the ear of the operator. This second warning tends to insure that the writing shall never be continued downward below or quite to the bottom of the paper.

Modifications may be made without departing from the principle or sacrificing the advantages of the invention. When carbon copies are required, two or more sheets of thin paper M may be applied one over the other with carbon paper between, in the ordinary manner. In some kinds of work it may be desired to have a number of tympans H, each properly equipped with the paper, ready to be instantly supplied as each sheet is filled. For copying long documents on legal cap, only the lowermost of the two indicators should be used.

Parts of the invention may be used without the whole. The bell L, with its supporting means K and its operating lever P and spring Q may be dispensed with and the eye alone depended upon for receiving the warning. With paper which is sufficiently transparent the line H' may serve alone as a sufficient indicator. The arm G may be permanently instead of removably attached.

The indicating devices may, obviously, be on the right instead of the left edge of the paper, and the arm G may extend either to the right or left, or in both directions. I prefer the whole as shown.

I claim as my invention—

1. In a type-writing machine, an indicator adapted to be fed through the machine with the paper, in combination with the arm G mounted on the carriage as shown, all arranged for joint operation substantially as herein specified.

2. In a type-writing machine, a flexible tympan carrying an indicator as the thin metal fold I' standing in front of the paper M to be printed, in combination with a device as the bell and hammer, arranged to be operated by the passage of the indicator to give an alarm when the type-writing arrives near the bottom of the sheet, as herein specified.

3. In a type-writing machine a flexible tympan carrying two indicators each having a part as the flap I' projecting, in combination with the bell L, and with operating means P, Q, arranged to be actuated successively by the indicator so as to give two warnings when the writing approaches the bottom of the paper, as herein specified.

In testimony that I claim the invention above set forth I affix my signature in presence of two witnesses.

FRANK W. STANLEY.

Witnesses:
GEO. ROSCHLAU,
GEO. C. ILLIUM, Jr.